(12) United States Patent  
McCluhan

(10) Patent No.: US 7,721,924 B2  
(45) Date of Patent: May 25, 2010

(54) BRACELET CONNECTION TOOL

(76) Inventor: John McCluhan, 401 Sibley St., Suite A102, St. Paul, MN (US) 55101

( * ) Notice: Subject to any disclaimer, the term of this patent is extended or adjusted under 35 U.S.C. 154(b) by 0 days.

(21) Appl. No.: 11/787,322

(22) Filed: Apr. 16, 2007

(65) Prior Publication Data

US 2008/0251549 A1  Oct. 16, 2008

(51) Int. Cl.  
*A47G 25/80* (2006.01)

(52) U.S. Cl. .................. 223/111; 223/120

(58) Field of Classification Search ........... 223/111, 223/120, DIG. 2  
See application file for complete search history.

(56) References Cited

U.S. PATENT DOCUMENTS

| | | | |
|---|---|---|---|
| 2,926,875 A * | 3/1960 | Hoye | 248/121 |
| 3,936,156 A * | 2/1976 | Shaw et al. | 359/802 |
| D323,132 S * | 1/1992 | Grennan | D11/87 |
| 5,405,066 A | 4/1995 | Fakier | |
| D385,212 S * | 10/1997 | Rychlik et al. | D11/87 |
| D387,253 S * | 12/1997 | Fakier | D8/14 |
| 5,785,217 A | 7/1998 | Gorham, Jr. | |
| 5,899,369 A | 5/1999 | Macripo | |
| 5,934,526 A | 8/1999 | Rosenbaum et al. | |
| 6,036,065 A | 3/2000 | Wofford et al. | |
| 6,095,346 A * | 8/2000 | Idelberger | 211/85.2 |
| 6,112,958 A | 9/2000 | LaMacchia et al. | |
| 6,484,910 B1 | 11/2002 | Korkos | |

* cited by examiner

*Primary Examiner*—Shaun R Hurley  
*Assistant Examiner*—Andrew W Sutton  
(74) *Attorney, Agent, or Firm*—Merchant & Gould P.C.

(57) ABSTRACT

A bracelet connection tool is disclosed that assists in the installation of a bracelet. The bracelet installation tool includes a base, a support beam, and a clamp. The support beam supports the clamp in a spaced relationship with the base. The clamp is capable of engaging a portion of the bracelet during installation. A method of installing a bracelet with the bracelet connection tool is also disclosed.

20 Claims, 14 Drawing Sheets

BRACELET CONNECTION TOOL

TECHNICAL FIELD

The present disclosure relates to bracelets, and more particularly to a tool to aid in the installation of a bracelet.

BACKGROUND

Bracelets, watches, and other jewelry or electronics are commonly worn on one or both wrists of an individual. Such items are referred to herein collectively as "bracelets." Bracelets often include a fastener having a first member located at one end of the bracelet, and a second member located at the other end of the bracelet. The first member and the second member can be connected together to attach the bracelet around the wrist of the individual.

A wide variety of fasteners exist for connecting the ends of the bracelet together. For example, one type of fastener includes a loop or ring at one end, and a clasp or clip at the other end. To connect the clasp to the loop, a small tab protruding from the clasp is depressed to open the clasp. A portion of the clasp is next inserted into the loop. The tab is then released to cause the clasp to close, fastening the clasp to the loop. Many other bracelet fastener designs also exist.

It is often difficult for the individual to install the bracelet on his or her own wrist due to the fact that only one hand is available to perform the necessary operations. Therefore, there is a need for a tool that will assist an individual in installing bracelets, wrist-worn ornamentation, or other devices.

SUMMARY

In general terms, this patent is directed to a tool for assisting an individual with the installation of a bracelet. In one possible configuration and by non-limiting example, the tool supports one end of a bracelet while the individual manipulates the other end of the bracelet to fasten it to his or her own wrist.

One aspect is a tool for assisting in the installation of a bracelet. The tool comprises a base, a support beam, and a clamp. The base is capable of engaging a surface. The support beam has a first end and a second end, the first end supported by the base, and the second end extending from the base. The clamp is supported by the second end of the support beam, and capable of engaging a portion of the bracelet.

Another aspect is a method of installing a bracelet around a wrist of a person having a first hand and a second hand, wherein the first hand is associated with the wrist. The method comprises engaging a first portion of the bracelet with a clamp, the clamp being supported in a spaced relationship from a base by a support beam; placing the first wrist adjacent the clamp; manipulating a second portion of the bracelet, generally opposite the first portion, to connect the first portion of the bracelet to the second portion, such that the bracelet surrounds the first wrist; and disengaging the bracelet from the clamp.

DETAILED DESCRIPTION OF THE PREFERRED EMBODIMENT

Figure 1:
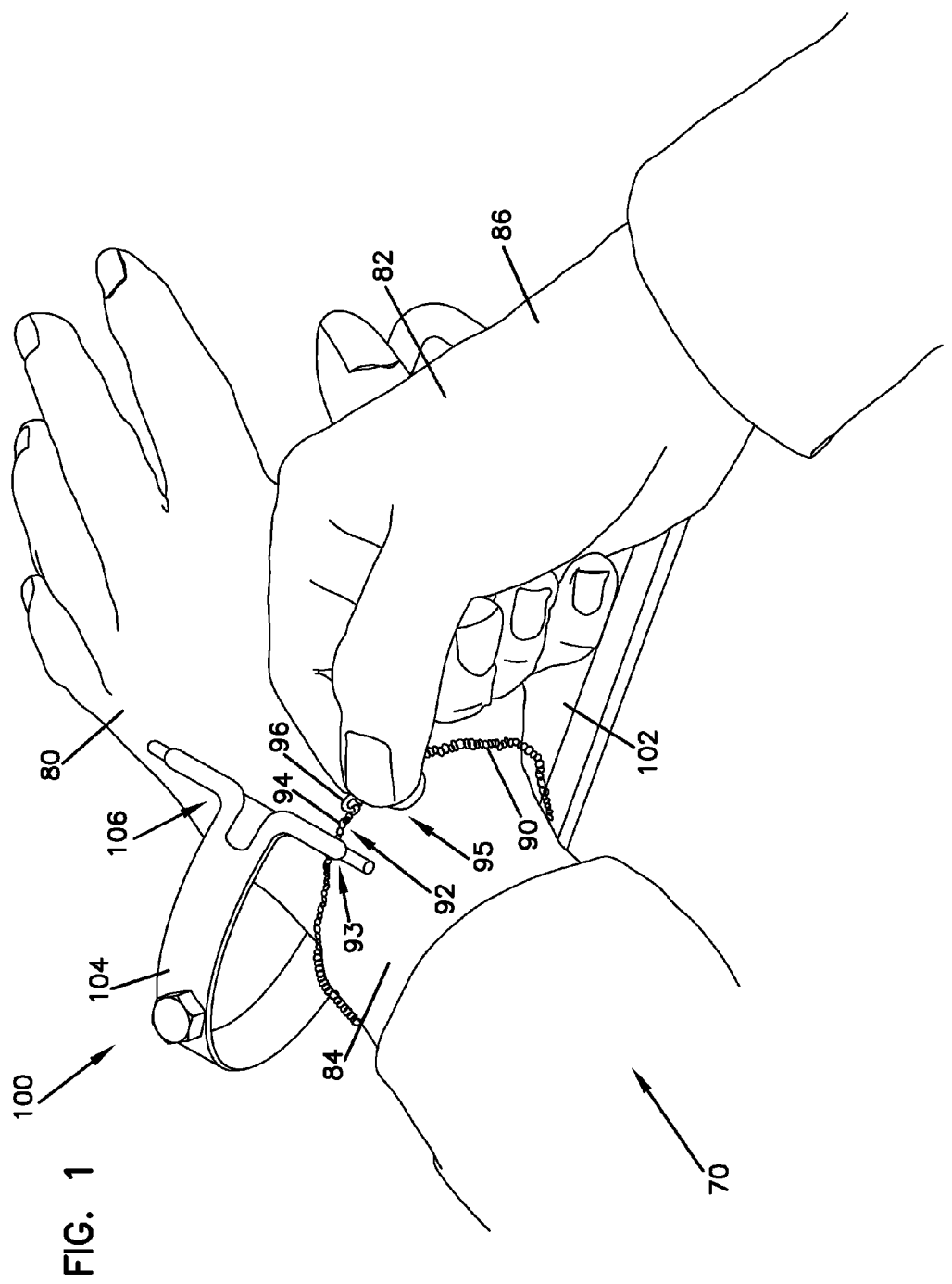
FIG. 1 is a perspective view of an example tool being used to install a bracelet on a wrist of an individual.

Various embodiments will be described in detail with reference to the drawings, were in like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a perspective view of example tool 100 being used to install a bracelet on a wrist of a person 70. Person 70 includes left hand 80 and right hand 82. Associated with left and right hands 80 and 82 are wrists 84 and 86, respectively. Bracelet 90 includes a first end 93 and a second end 95 and a fastener 92 includes a first fastener member 94 at first end 93 and a second fastener member 96 at second end 95. Fastener 92 is any type of clasp or fastener. Examples of common clasp types include a lobster clasp, a spring ring, a box clasp, and a barrel clasp.

In the illustrated example, person 70 desires to use tool 100 to install bracelet 90 onto wrist 84. In this example, tool 100 includes base 102, support beam 104, and clamp 106. In the illustrated embodiment, support beam 104 supports clamp 106 at a distance relative to base 102. Clamp 106 is capable of engaging a portion of bracelet 90, such as first end 93 of bracelet 90. In this way, tool 100 assists person 70 by supporting first end 93, while person 70 manipulates and connects the second end 95 to it.

In one embodiment, a method of installing a bracelet involves the following operations. Engage first end 93 of bracelet 90 with clamp 106. Place wrist 84 of the person 70 adjacent clamp 106, between clamp 106 and base 102. Wrap bracelet 90 around wrist 84 using right hand 82. Connect second fastener member 96 of second end 95 to first fastener member 94 of first end 93. This operation is performed, for example, with right hand 82. Disengage bracelet 90 from clamp 106, such as by sliding bracelet 90 out from clamp 106. Other embodiments include variations on this method.

Figure 2:
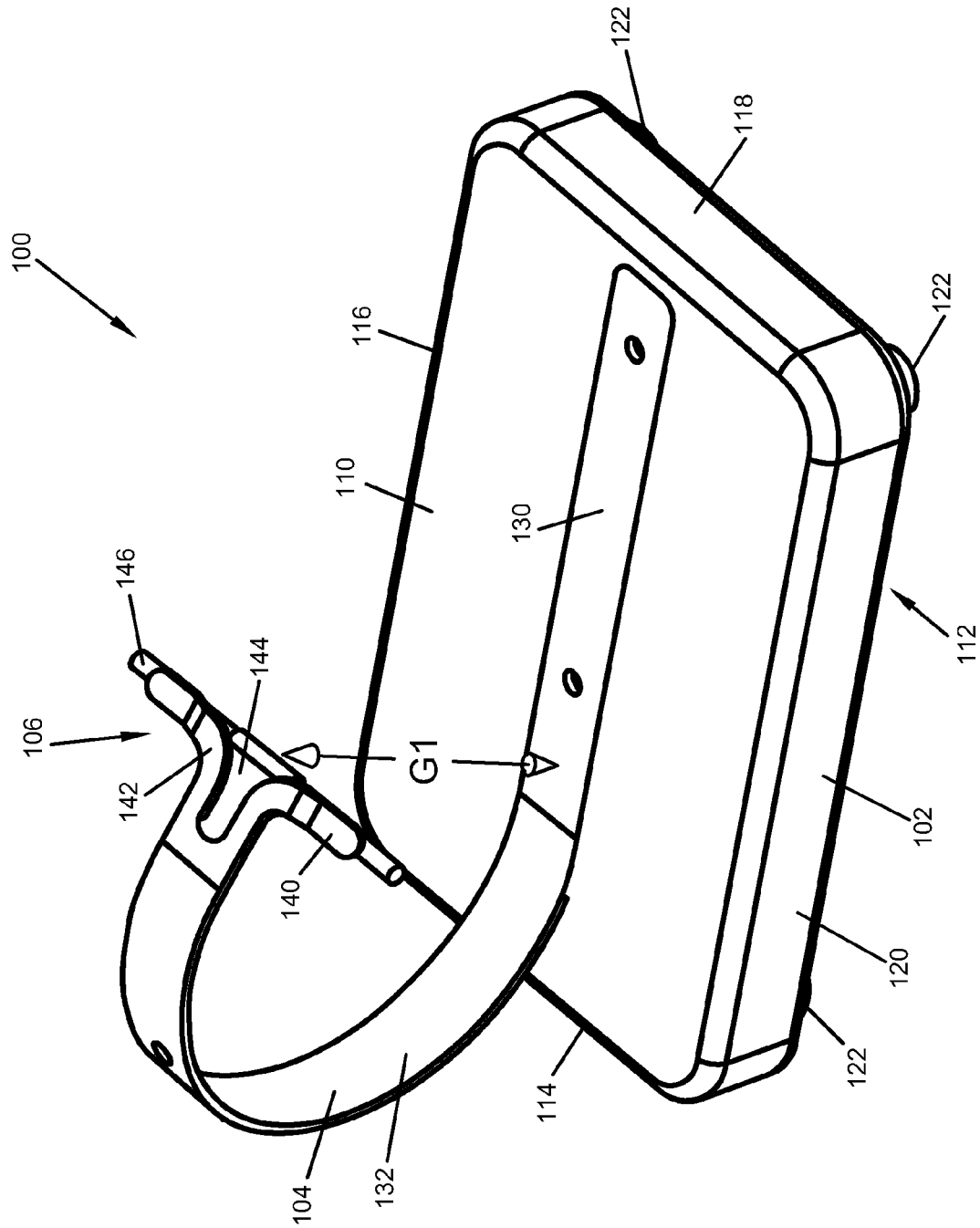
FIG. 2 is a perspective view of the tool shown in FIG. 1.
Figure 3:
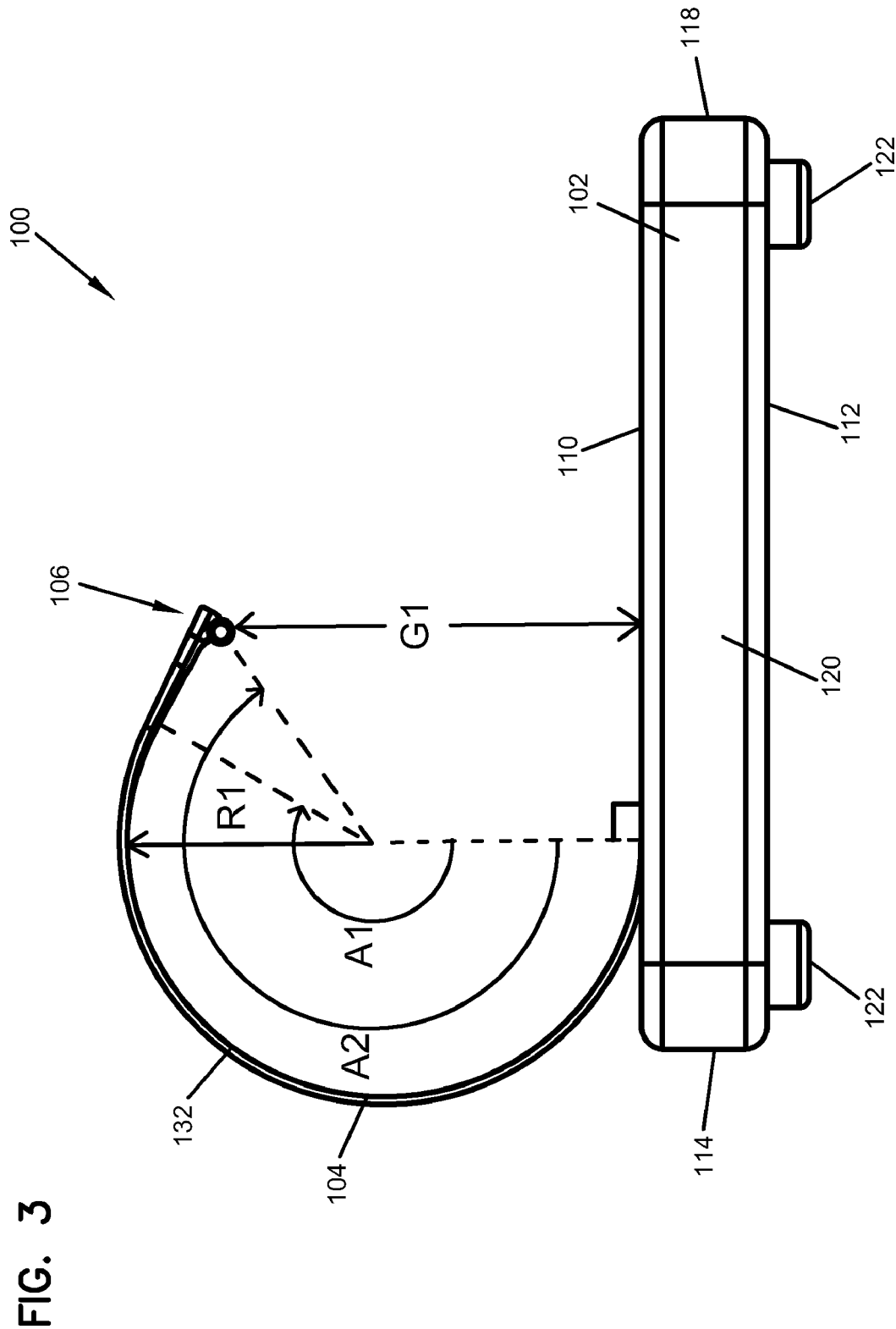
FIG. 3 is a side view of the tool shown in FIG. 1.
Figure 4:
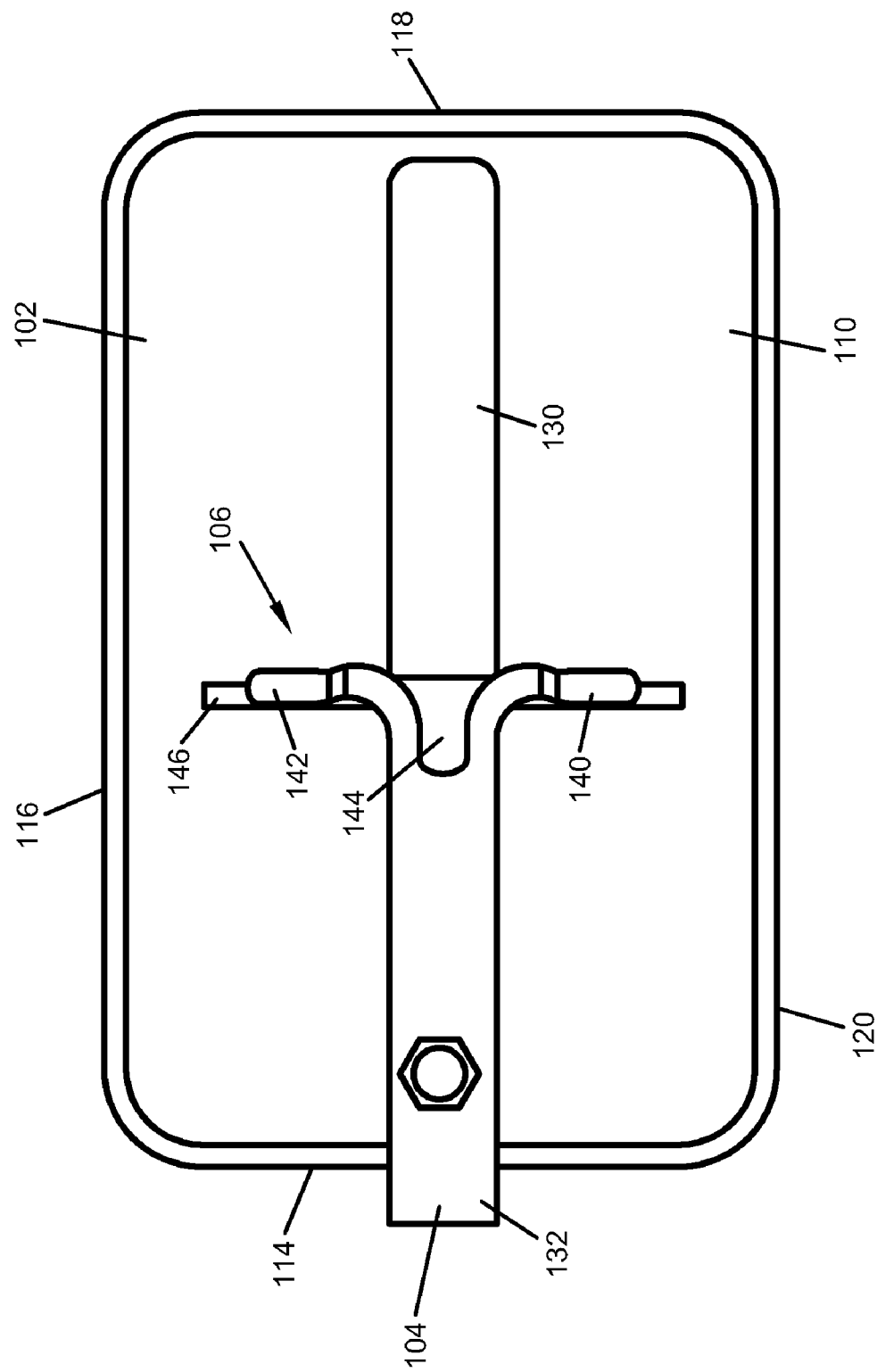
FIG. 4 is a top view of the tool shown in FIG. 1

FIGS. 2-4 illustrate various views of example tool 100. FIG. 2 is a perspective view of example tool 100. FIG. 3 is a side view of example tool 100. FIG. 4 is a top view of example tool 100. In the illustrated embodiment, tool 100 includes base 102, support beam 104, and clamp 106. Support beam 104 is connected at one end to base 102 and is connected at the other end to clamp 106. Support beam 104 separates clamp 106 from base 102.

In one embodiment, base 102 includes top 110 and bottom 112, opposite top 110. Base 102 further includes sides 116, 118, 119, and 120, between top 110 and bottom 112. In this embodiment, base 102 is a substantially rectangular block. In one embodiment, base 102 is capable of engaging with a surface, such as a table, dresser, shelf, jewelry box. Other embodiments are capable of engaging with any other generally flat surface to provide stability and support to tool 100. Base 102 engages with the surface, for example, by friction. Alternatively, base 102 engages the surface with an adhesive, fastener, or the like. In other possible embodiments, base 102 is a circle, square, cube, triangle, or any other shape including complex and decorative shapes. In one embodiment, base 102 is made from wood. In another embodiment, base 102 is made from plastic. In other possible embodiments, base 102 is made from one or more metals, ceramic, stone, or any other suitable material or combination of materials. In another possible embodiment, base 102 is a clamp, hook, or any other device capable of engaging with one or more surfaces.

To provide additional stability, feet 122 are included in one embodiment. Feet 122 can be made, for example, from rubber, plastic, wood, cloth such as felt or wool, and the like, to frictionally engage with a surface and/or to protect the surface from being scratched. In another embodiment, a coating or layer is applied to bottom 112 to frictionally engage with the surface and/or to protect the surface from being scratched. In another possible embodiment, base 102 is designed to be placed directly onto the surface without any feet or protective layers or coatings.

In the illustrated embodiment, support beam 104 includes region 130 and region 132. Region 130 is a portion of support beam 104 that is connected to base 102. Region 132 is adjacent region 130 and extends out from base 102.

Figure 6:
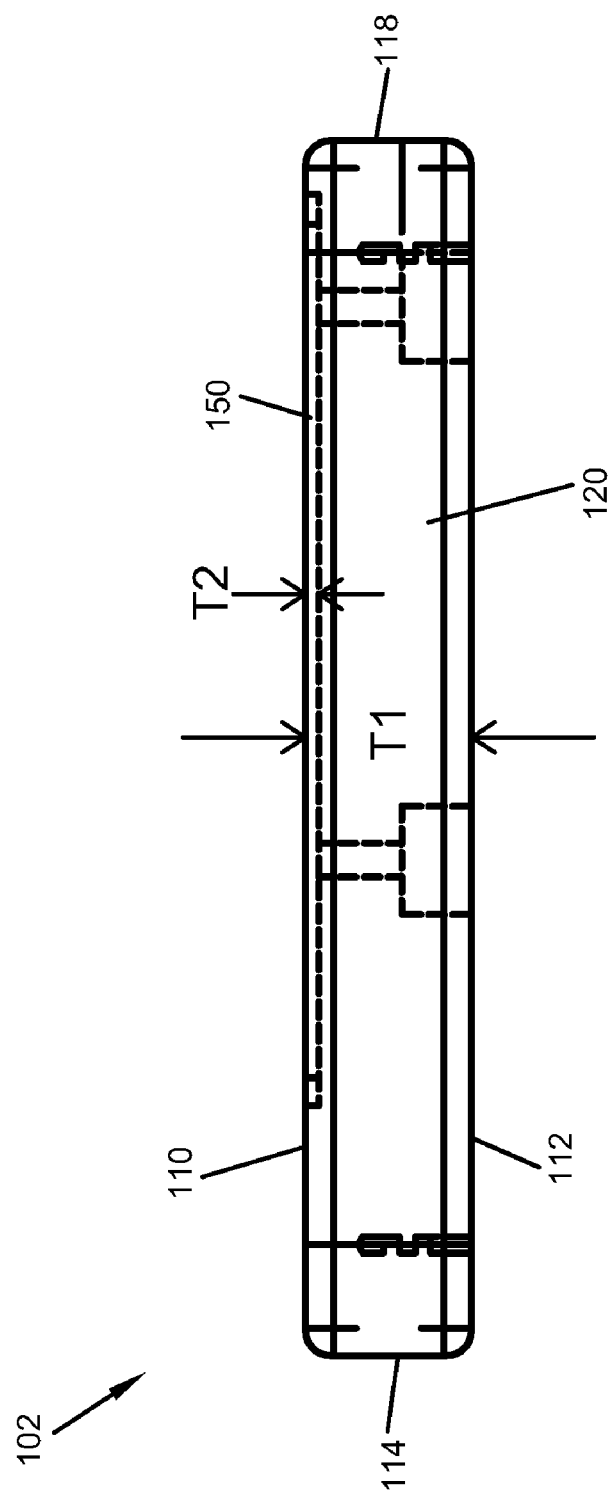
FIG. 6 is a side view of the base shown in FIG. 5.

In one embodiment, a surface of region 130 lies in a common plane with a top of the base (e.g. top 110 of base 102 shown in FIG. 6). In another embodiment, region 130 lies in a plane parallel with a top of the base, but separated by the top by a distance. In another embodiment, base 102 is not required. In such embodiments, region 130 is mounted directly to a table top, or other surface. In another embodiment, region 130 is itself enlarged to perform the function of the base.

Clamp 106 is connected to region 132, opposite region 130, to form gap G1 between clamp 106 and base 102. A wrist (e.g., wrist 84 or 86, shown in FIG. 1) of person 70 is capable of being inserted between gap GI for the installation of a bracelet (e.g., bracelet 90, shown in FIG. 1). In the illustrated embodiment, region 132 has a generally arcuate shape with radius of curvature R1. Region 132 forms an arc having a radius of curvature R1 and angle A1. Region 132 and clamp 106 together form an arc having angle A2.

In possible embodiments, region 132 is formed having an arcuate shape, which may be circular or elliptical. In the illustrated embodiment, region 132 forms an arc having angle A1. In one embodiment, angle A1 is in a range from about 90 degrees to about 270 degrees, and preferably from about 180 degrees to about 225 degrees. One of the benefits of this embodiment is that clamp 106 extends at least partially over the wrist (e.g., wrist 84, shown in FIG. 1). This is beneficial because it enables the bracelet to be connected by the other hand (e.g., hand 82) without having to cross hands. It is also beneficial because it places clamp in a highly visible location generally over or just beyond the wrist.

In another embodiment, angle A1 is in a range from about 200 degrees to about 210 degrees. In another embodiment, angle A1 is in a range from 210 degrees to about 360 degrees. A 360 degree embodiment, wherein a complete loop is formed, is another possible embodiment. In this embodiment, clamp 106 is connected to a portion of the loop, rather than an end of region 132.

As also shown in the illustrated embodiment, region 132 and clamp 106 together form an arc having angle A2. In one example embodiment, angle A2 is greater than angle A1 because clamp 106 extends beyond an end of region 132. In this embodiment, angle A2 is in a range from about 100 degrees to about 280 degrees, and preferably from about 190 degrees to about 235 degrees. In another embodiment, angle A2 is in a range from about 220 degrees to about 230 degrees. As described above, another embodiment includes region 132 having a complete loop, to which clamp 106 is attached.

In the illustrated embodiment, clamp 106 is connected to support beam 104, at an end opposite base 102. In this embodiment, clamp 106 includes arms 140 and 142, flexible member 144, and bar 146. Arms 140 and 142 extend out from support beam 104 and in a direction generally perpendicular to support beam 104. Bar 146 is adjacent to arms 140 and 142, and also extends in a direction generally perpendicular to support beam 104, such that arms 140 and 142 and bar 146 are oriented generally and substantially parallel to each other. Flexible member 144 extends between support beam 104 and bar 146. Flexible member 144 exerts a force upon bar 146 in a direction toward arms 140 and 142.

Figure 7:
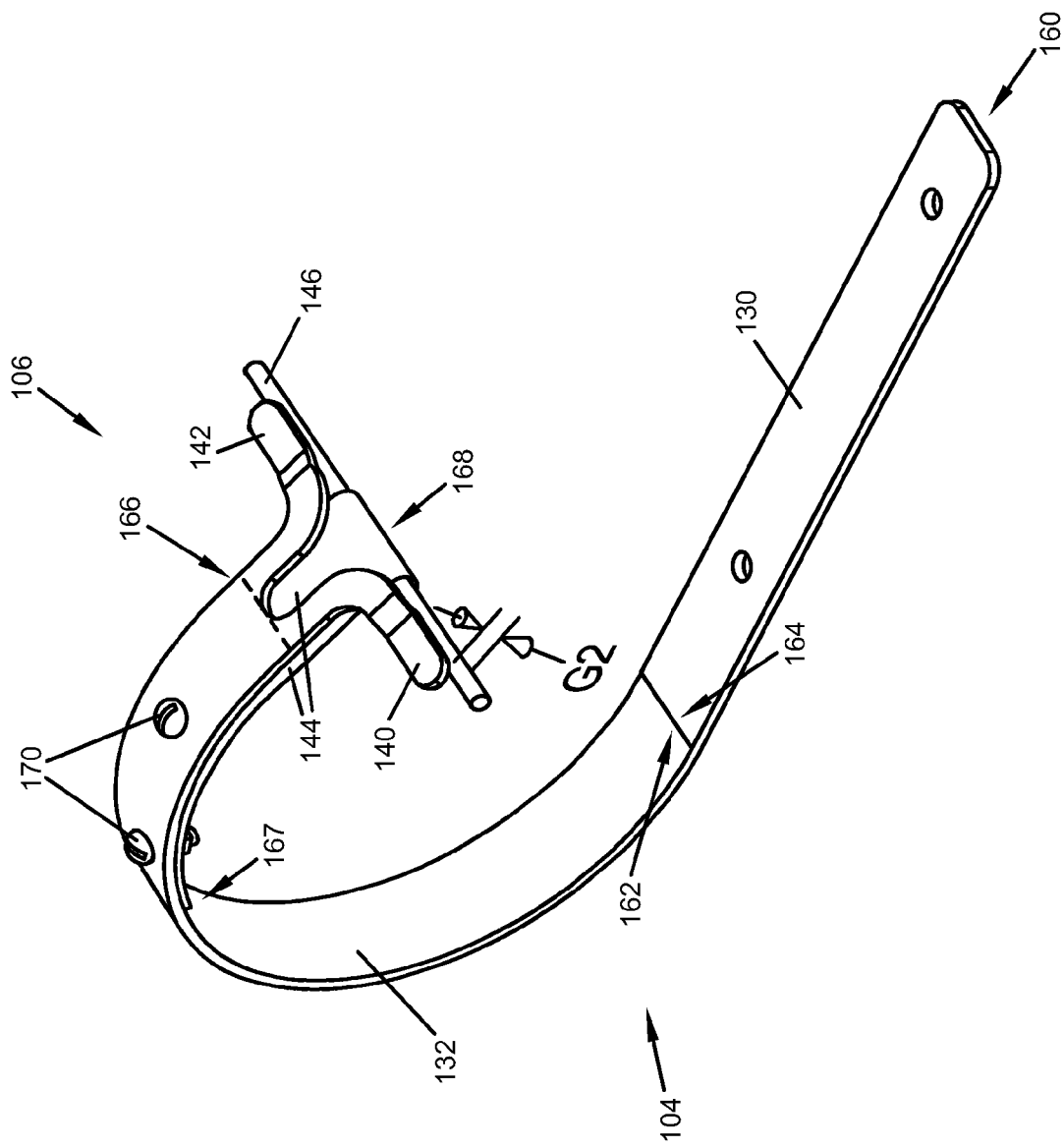
FIG. 7 is a perspective view of a support beam and a clamp of the tool shown in FIG. 1.

Clamp 106 is capable of engaging a portion of bracelet 90 during installation of bracelet 90 onto wrist 84. To do so, a force is applied to bar 146 or flexible member 144 in a direction away from arms 140 and 142. This force causes flexible member 144 to bend and bar 146 to become spaced from arms 140 and 142 (such as shown in FIG. 7). The portion of the bracelet, such as first end 93, is then inserted into the space formed between one of arms 140 and 142 and bar 146. The force applied to flexible member 144 is then released to clamp the portion of the bracelet between one of arms 140 and 142 and bar 146. The portion of the bracelet is securely held to enable the bracelet to be easily installed onto a wrist of a person.

In the illustrated embodiment, clamp 106 is designed for ambidextrous installation of a bracelet. Specifically, clamp 106 includes two clamp regions, one on each side. A left clamp region is designed for installation of a bracelet onto the left wrist 84, and includes arm 140 and the adjacent portion of bar 146. A right clamp region is designed for installation of a bracelet onto the right wrist 86, and includes arm 142 and the adjacent portion of bar 146.

Left-hand installation is illustrated in FIG. 1, in which a portion of the bracelet is inserted into the left clamp region including arm 140. In this configuration, tool 100 is oriented such that when left wrist 84 is placed between clamp 106 and base 102, support beam 104 is located to the left of wrist 84. Right hand 82 is then free to manipulate a clasp or other fastener to secure the bracelet around wrist 84.

Right-hand installation can also be performed with tool 100. In this case, tool 100 is rotated 180 degrees, such that when right wrist 86 is placed between clamp 106 and base 102, support beam 104 is located to the right of wrist 86. Left hand 80 is free to manipulate a clasp or other fastener to secure the bracelet around wrist 86.

In another embodiment, clamp 106 includes only a single clamp region, and only one of arms 140 and 142. In this embodiment, one side of clamp 106 is removed. In another possible embodiment, clamp 106 extends substantially parallel from the end of support beam 104 and region 132. In this embodiment, arm 140 and bar 146 are parallel with the end of support bar 104. In another possible embodiment, clamp 106 is pivotally connected to support beam 104, such that it can be pivoted in any direction relative to the end support beam 104. For example, a ball and socket joint is used to provide such a joint. Other possible embodiments include other known joints.

Other possible embodiments include different types of clamps in place of clamp 106. For example, a spring clamp can be used, such as an alligator clip configuration. Another possible embodiment includes a vice-type clamp, wherein a screw force is used to engage the bracelet. In another possible embodiment, rubber, cloth, or other material is placed inside the clamp to provide padding between the clamp and the bracelet.

Figure 5:
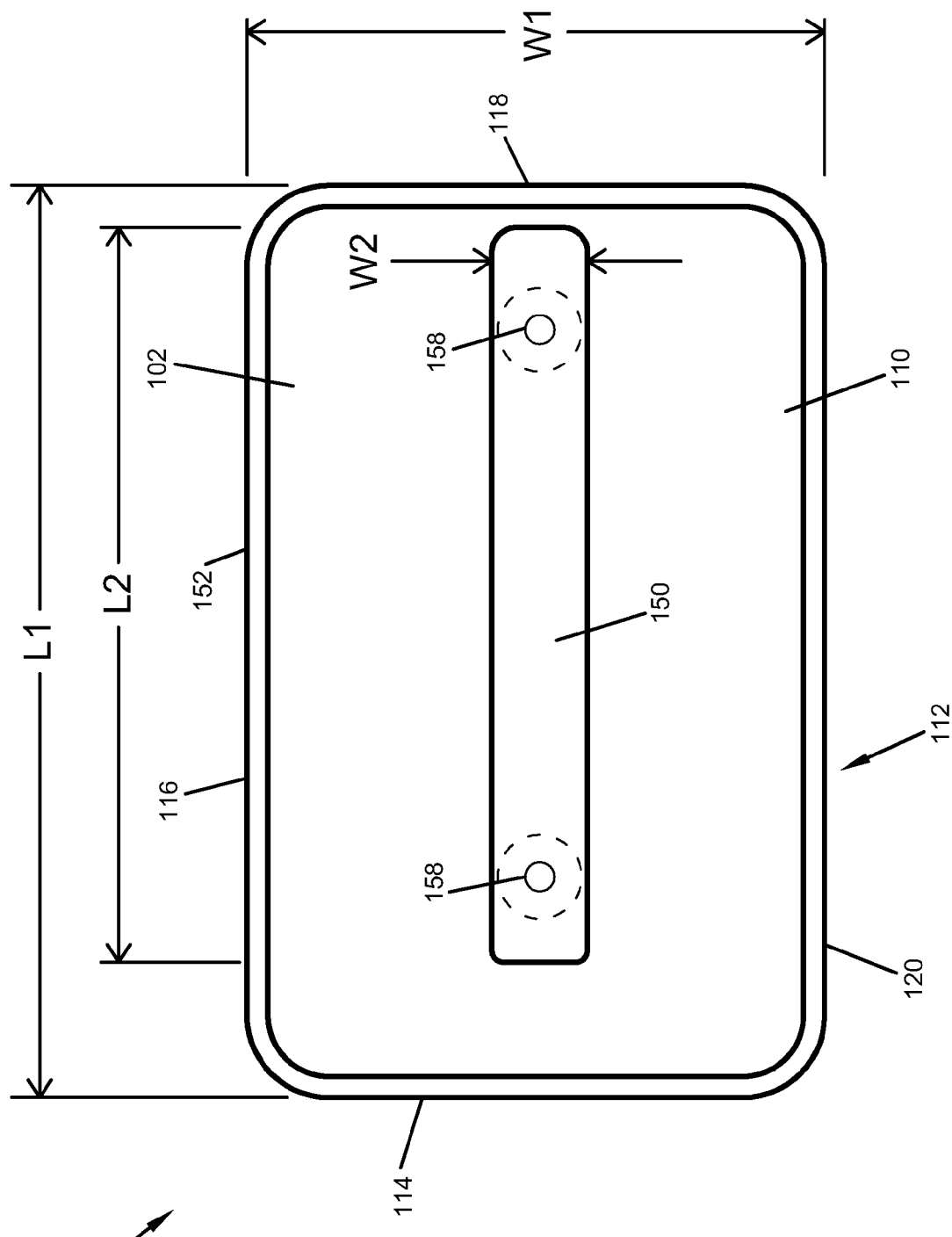
FIG. 5 is a top view of an example base of the tool shown in FIG. 1.

FIG. 5 is a top view of an example of base 102. In this example, base 102 includes top 110, bottom 112, sides 114, 116, 118, and 120, groove 150, edges 152, and holes 158. Side 114 is opposite side 118, and side 116 is opposite side 120. Groove 150 is formed in top 110 of base 102. Groove 150 is sized and shaped to receive region 130 of support beam 104. In the illustrated example, groove 150 extends longitudinally along a center line of top 110. In another embodiment, base 102 does not include groove 150. In this embodiment, support beam 104 is connected directly to top 110 of base 102.

Base 102 is formed of wood, plastic, ceramic, stone, or any other suitable material. In one example, a rough block of material is cut generally to size using a saw, laser beam, grinder, knife, chisel, or any other suitable tool. The edges are then sanded and/or polished to provide smooth surfaces. Alternatively, no sanding or polishing is required. In another possible embodiment, a protective coating such as paint or stain is applied to base 102 to provide the desired color and/or to protect base 102 from scratches, dents, moisture, and the like.

In the illustrated embodiment, base 102 includes rounded or sloped edges 152. Rounded edges 152 provide a more decorative appearance to base 102. In addition, rounded edges reduce or eliminate sharp corners. Rounded edges 152 are formed on base 102, such as by using a router having any desired router bit. In another embodiment, rounded edges 152 are formed by sanding or grinding the corners of base 102.

In the illustrated embodiment, holes 158 are drilled through base 102 and groove 150. Holes 158 are used to fasten support beam 104 to base 102 using fasteners, such as screws, nails, bolts, and the like. Alternatively, any other suitable faster can be used including an adhesive applied between base 102 and support beam 104, in which case holes 158 are not necessary. In another embodiment, support beam 104 is formed integral to base 102, such as by molding from plastic, metal, or any other suitable material, or by 3D printing.

Dimensions will now be provided to further explain the design of the example illustrated in FIG. 5. Length L1 is the overall length of base 102, from side 114 to side 118. Length L1 is in a range from about 3 inches to about 10 inches, and preferably from about 5 inches to about 6 inches. Width W1 is the overall width of base 102, from side 118 to side 120. Width W1 is in a range from about 2 inches to about 8 inches, and preferably from about 3 inches to about 4 inches.

In one embodiment, groove 150 is formed into top 110 of base 102. Length L2 of groove 150 is in a range from about 1 inch to about 8 inches, and preferably from about 3 inches to about 5 inches. Width W2 of groove 150 is slightly larger than the width of support beam 104. Width W2 is in a range from about 0.2 inches to about 2 inches, and preferably from about 0.3 inches to about 0.8 inches.

FIG. 6 is a side view of an example of base 102. Base 102 includes top 110, bottom 112, sides 114, 118, and 120, and groove 150. In the illustrated embodiment of FIG. 6, T1 is the thickness of base 102, from top 110 to bottom 112. Thickness T1 is in a range from about 0.2 inches to about 4 inches, and preferably from about 0.5 inches to about 1 inch. Thickness T2 is the depth of groove 150. Thickness T2 is approximately the thickness of region 130 of support beam 104 (such as shown in FIGS. 2-4). In this way, region 130 is substantially flush with top 110 when installed into groove 150. Thickness T2 is in a range from about 0.01 inches to about 0.2 inches, and preferably from about 0.04 inches to about 0.08 inches.

FIG. 7 is a perspective view of support beam 104 and clamp 106, wherein clamp 106 is disconnected from base 102, and wherein clamp 106 is open to receive a portion of a bracelet. Support beam 104 includes region 130 and region 132. Region 130 includes first end 160 and second end 162, opposite first end 160. Region 132 includes third end 164 and fourth end 166, opposite third end 164. Second end 162 of region 130 is connected to third end 164 of region 132.

In the illustrated embodiment, clamp 106 includes first arm 140, second arm 142, flexible member 144, and beam 146. First and second arms 140 and 142 extend from and are connected to fourth end 166 of region 132. Flexible member 144 is connected to region 132 between third end 164 and fourth end 166. In the illustrated embodiment of FIG. 7, fasteners 170, such as bolts and nuts are used to connect flexible member 144 to region 132. Alternatively, any other fastener could also be used including rivets, screws, adhesive, and the like. Flexible member 144 includes end 167 and end 168, opposite end 167. Flexible member 144 supports beam 146 at end 168.

Clamp 106 is opened by applying a force to either beam 146 or to end 168 of flexible member 144 in a direction away from arms 140 and 142. The force causes end 168 of flexible member 144 to bend with respect to end 167 of flexible member 144 and in a direction generally toward region 130. In this way, a gap G2 is formed between arms 140 and 142 and beam 146. When a sufficient force is applied, gap G2 between arms 140 and 142 and beam 146 will be sufficiently large to receive a portion of a bracelet. After the portion of the bracelet has been inserted, the force is removed to securely clamp the portion of the bracelet between arm 140 or arm 142 and beam 146.

In another possible embodiment, clamp 106 is formed generally upside down from the illustrated embodiment. In this embodiment, flexible member 144 is connected to the top side of region 132, such that flexible member 144 supports bar 146 generally above arms 140 and 142. Clamp 106 is opened in this embodiment by applying a force to bar 146 or flexible member 144 in a direction generally away from region 130 and base 102.

Figure 8:
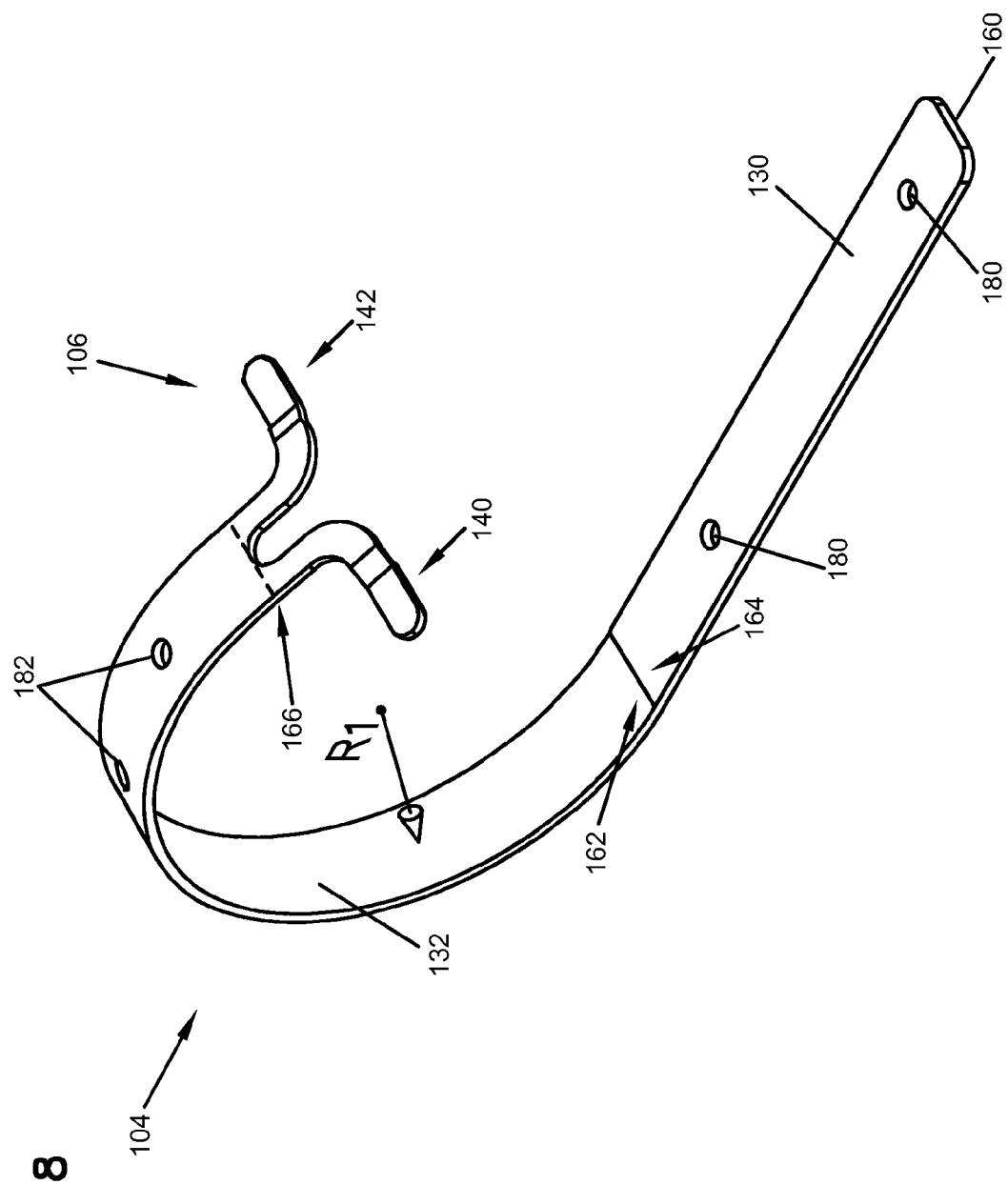
FIG. 8 is a perspective view of the support beam and a portion of the clamp shown in FIG. 7.

FIG. 8 is a perspective view of example support beam 104 and a portion of example clamp 106. Support beam 104 includes region 130 and region 132. Clamp 106 includes arms 140 and 142. Region 130 includes first end 160 and second end 162, opposite first end 160. In one embodiment, region 130 is a generally flat and rectangular region, configured to be connected to a base (such as base 102, shown in FIG. 5). Holes 180 are provided in region 130 for connecting region 130 to a base, such as with fasteners. Fasteners include screws, bolts, nuts, nails, rivets, welds, adhesive or the like. In another possible embodiment, holes 180 are not necessary.

In the illustrated embodiment, end 162 of region 130 is connected to third end 164 of region 132. In one embodiment, region 130 and 132 are formed of the same piece. In another possible embodiment, region 132 is connected to region 130 by a fastener. Any fastener could be used including welds, screws, bolts and nuts, adhesive, and the like. In one example, ends 162 and 164 overlap to provide surfaces capable of being connected by fasteners.

Region 132 of support beam 104 supports clamp 106 in a spaced relationship to base 102. In the illustrated embodiment, region 132 has an arcuate shape. One of the benefits of an arcuate shape is that it is similar to the shape of a person's wrist. Therefore, when a wrist is inserted adjacent to region 132, the arcuate shape generally follows the contour of the person's wrist. In one embodiment, region 132 has a radius of curvature R1. In a possible embodiment, R1 is larger than the average size of an adult human wrist, to enable a wrist to be inserted at least partially within region 132. In another possible embodiment, R1 is in a range from about 1 inch to about 3 inches, and preferably from about 1 inch to about 2 inches.

In possible embodiments, region 132 forms a non-circular shape. For example, region 132 is formed having an oval or elliptical shape. Any other shape could also be used, such as a square, triangle, rectangle, pentagon, hexagon, and the like, or any portion of these shapes.

In other possible embodiments, region 132 is not curved. In one embodiment, region 132 is a straight vertical beam. In another embodiment, region 132 is "L-shaped." A variety of other shapes are also possible. In one embodiment, all that is required is that region 132 support clamp 106 in a spaced relationship to base 102. In another embodiment, support beam 104 does not include region 130, but rather region 132 is connected directly to base 102. For example, support beam 104 is a straight beam that extends generally normal to the top of base 102. In such an embodiment, clamp 106 is held in a spaced relationship to base 102 by support beam 104.

In one embodiment, holes are formed in region 132 for the connection of one or more portions of clamp 106. For example, fasteners (such as fasteners 170 shown in FIG. 7) are inserted through holes 182 and into the flexible member (such as flexible member 144, shown in FIG. 7) to rigidly support a portion of the flexible member.

Figure 9:
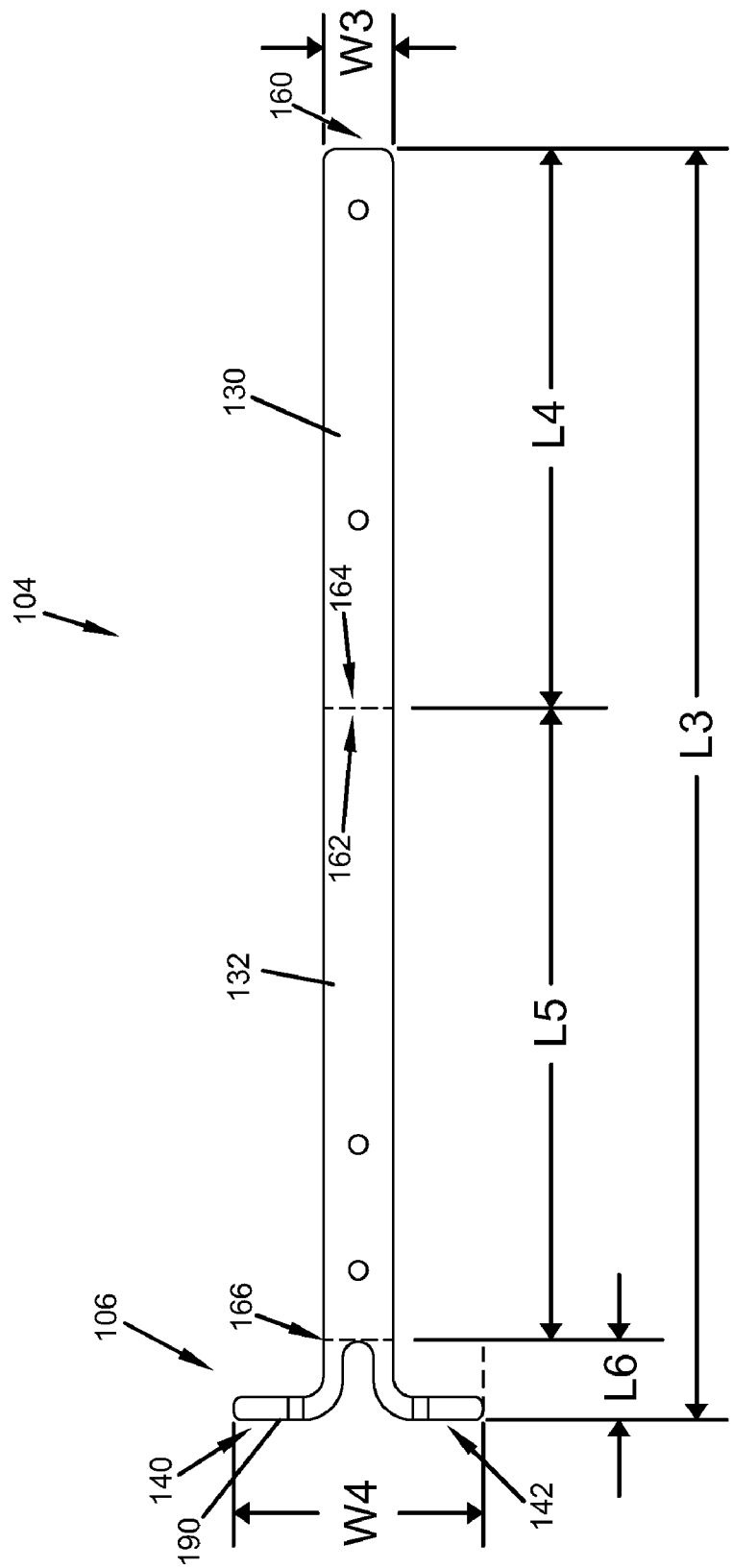
FIG. 9 is a top view of the support beam and the portion of the clamp shown in FIG. 8.

FIG. 9 is a top view of example support beam 104 and a portion of example clamp 106, prior to bending. Support beam 104 includes region 130 and region 132. Clamp 106 includes arm 140 and arm 142.

In one embodiment, support beam 104 and arms 140 and 142 are constructed from a piece of sheet metal. The features are machined from the sheet metal such as by cutting with a saw, laser beam, drill, or by any other known method. The resulting metal is then bent into the desired shape and configuration.

To further explain the illustrated embodiment, example dimensions will now be provided. Other embodiments are possible that include other dimensions. Length L3 is the overall length from first end 160 to the distal edge of arms 140 and 142. Length L3 is in a range from about 5 inches to about 18 inches, and preferably from about 8 inches to about 12 inches. In another possible embodiment, length L3 is in a range from about 10 inches to about 11 inches.

Length L4 is the length of region 130 from first end 160 to second end 162. Length L4 is in a range from about 1 inch to about 8 inches, and preferably from about 3 inches to about 5 inches. Length L5 is the length of region 132 prior to bending, from third end 164 to fourth end 166. Length L5 is in a range from about 3 inches to about 10 inches, and preferably from about 4 inches to about 6 inches. Length L6 is the length of arms 140 and 142 from fourth end 166 to distal end 190. Length L6 is in a range from about 0.125 inches to about 2 inches, and preferably from about 0.25 inches to about 1 inch.

In the illustrated embodiment, width W3 of support beam 104 is slightly less than width W2 of groove 150 (shown in FIG. 5). For example, width W3 is in a range from about 0.2 inches to about 2 inches, and preferably from about 0.3 inches to about 0.8 inches. In other possible embodiments, the width of support beam 104 is not constant. In one example, width W3 is tapered. In another embodiment, the width of region 130 is different than the width of region 132. Other shapes and configurations are also possible. In the illustrated embodiment, width W4 is the overall width from one end of arm 140 to the opposite end of arm 142. Width W4 is in a range from about 0.5 inches to about 4 inches, and preferably from about 1 inch to about 3 inches.

Figure 10:
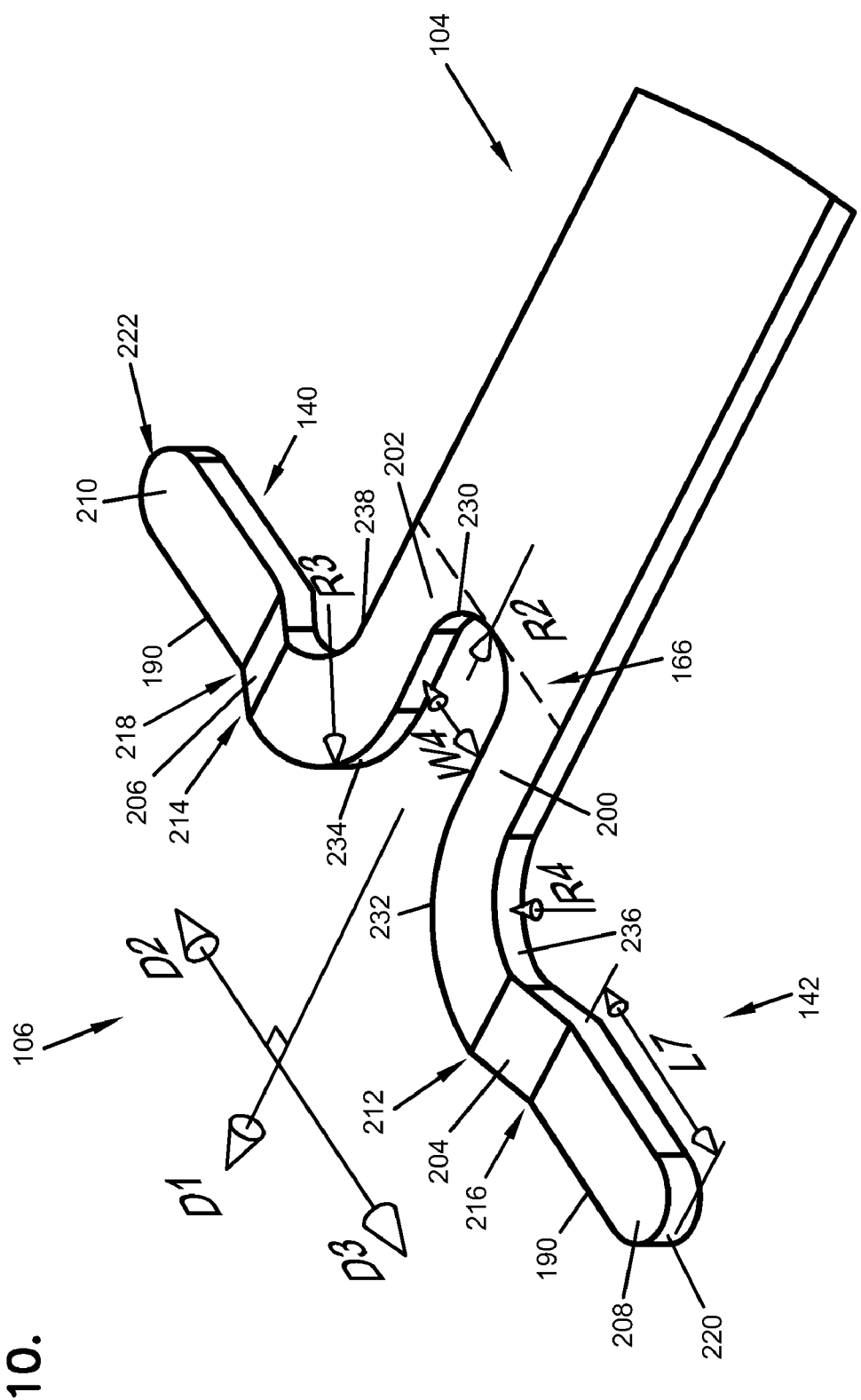
FIG. 10 is a perspective view of the portion of the clamp shown in FIG. 7.

FIG. 10 is a perspective view of a portion of example clamp 106 extending from support beam 104. In the illustrated embodiment, the portion of clamp 106 includes first arm 140 and second arm 142. In this embodiment, arms 140 and 142 include extension members 200 and 202, transition members 204 and 206, and feet 208 and 210. Extension members 200 and 202 extend from fourth end 166 to ends 212 and 214, respectively. Transition members 204 and 206 extend from ends 212 and 214 of extension members 200 and 202 to ends 216 and 218, respectively. Feet 208 and 210 extend from ends 216 and 218 of transition members 204 and 206 to tips 220 and 222, respectively. In the illustrated embodiment, fourth end 166 of region 132 extends in a direction D1. In one example, arms 140 and 142 extend generally in directions D2 and D3 respectively, which are substantially perpendicular to direction D1, and substantially horizontal plane.

In the illustrated embodiment, extension members 200 and 202 include concave region 230. Concave region 230 is an arcuate region having a radius of curvature R2. In the illustrated embodiment, concave region 230 is a half circle having radius R2. Radius R2 is in a range from about 0.03 inches to about 0.5 inches, and preferably from 0.1 to about 0.2 inches. A gap is formed between arms 140 and 142 by concave region 230 and a portion of arcuate regions 232 and 234. The gap has width W4. W4 is in a range from about 0.05 inches to about 0.3 inches and preferably from about 0.1 inches to about 0.2 inches.

In this embodiment, extension members 200 and 202 also include arcuate regions 232 and 234. Arcuate regions 232 and 234 have a radius of curvature R3. R3 is in a range from about 0.03 inches to about 0.5 inches, and preferably from about 0.2 inches to about 0.4 inches. Extension members 200 and 202 also include arcuate regions 236 and 238 opposite arcuate regions 232 and 234, respectively. Arcuate regions 236 and 238 have a radius of curvature R4. Radius R4 is in a range from about 0.02 inches to about 0.4 inches, and preferably from about 0.1 inches to about 0.3 inches. Extension members 200 and 202 terminate at ends 212 and 214. Extension members 200 and 202 extend generally parallel with direction D1 adjacent to fourth end 166. Extension members 200 and 202 then curve outward with arcuate regions 232, 234 236, and 238 such that extension members 200 and 202 extend in directions D3 and D2, respectively, adjacent to ends 212 and 214.

In this example, transition members 204 and 206 extend from ends 212 and 214 of extension members 200 and 202. In one embodiment, transition members 204 and 206 extend in direction D3 and D2, respectively. Transition members 204 and 206 slope down from ends 212 and 214 to ends 216 and 218, in a direction toward base 102. In this way, extension and transition members 200, 202, 204, and 206 are elevated above a plane that extends through feet 208 and 210.

The illustrated example includes feet 208 and 210 that extend out from ends 216 and 218, and in direction D3 and D2, respectively. Feet 208 and 210 form an upper surface of clamp 106 capable of engaging with a portion of a bracelet. In one embodiment, feet 208 and 210 have length L7. Length L7 is in a range from 0.1 inches to about 3 inches, and preferably from about 0.3 inches to about 0.5 inches. Another possible embodiment is specifically intended for watches or other jewelry having a wide band. In this embodiment, L7 is larger to better accommodate the width of the band. For example, L7 is in a range from about 0.5 inches to about 1 inch. Other embodiments will include other dimensions.

In another embodiment, transition members 204 and 206 are not included, such that extension members 200 and 202 lie in the same plane. In another embodiment, directions D2 and D3 are not perpendicular to D1, such that feet 208 and 210 are oriented having an angle other than 90 degrees to direction D1. For example, D2 and D3 are oriented in a range from 0 degrees to 90 degrees from direction D1.

In another embodiment, extension members 200 and 202 are "L-shaped" rather than having curved or arcuate regions. In another embodiment, extension members are generally straight, and extend in direction D1. In another embodiment, feet 208 and 210 extend directly out from support beam 104 adjacent to fourth end 166 in direction D1. Other variations, shapes, designs, and configurations are also possible in other embodiments.

Figure 11:
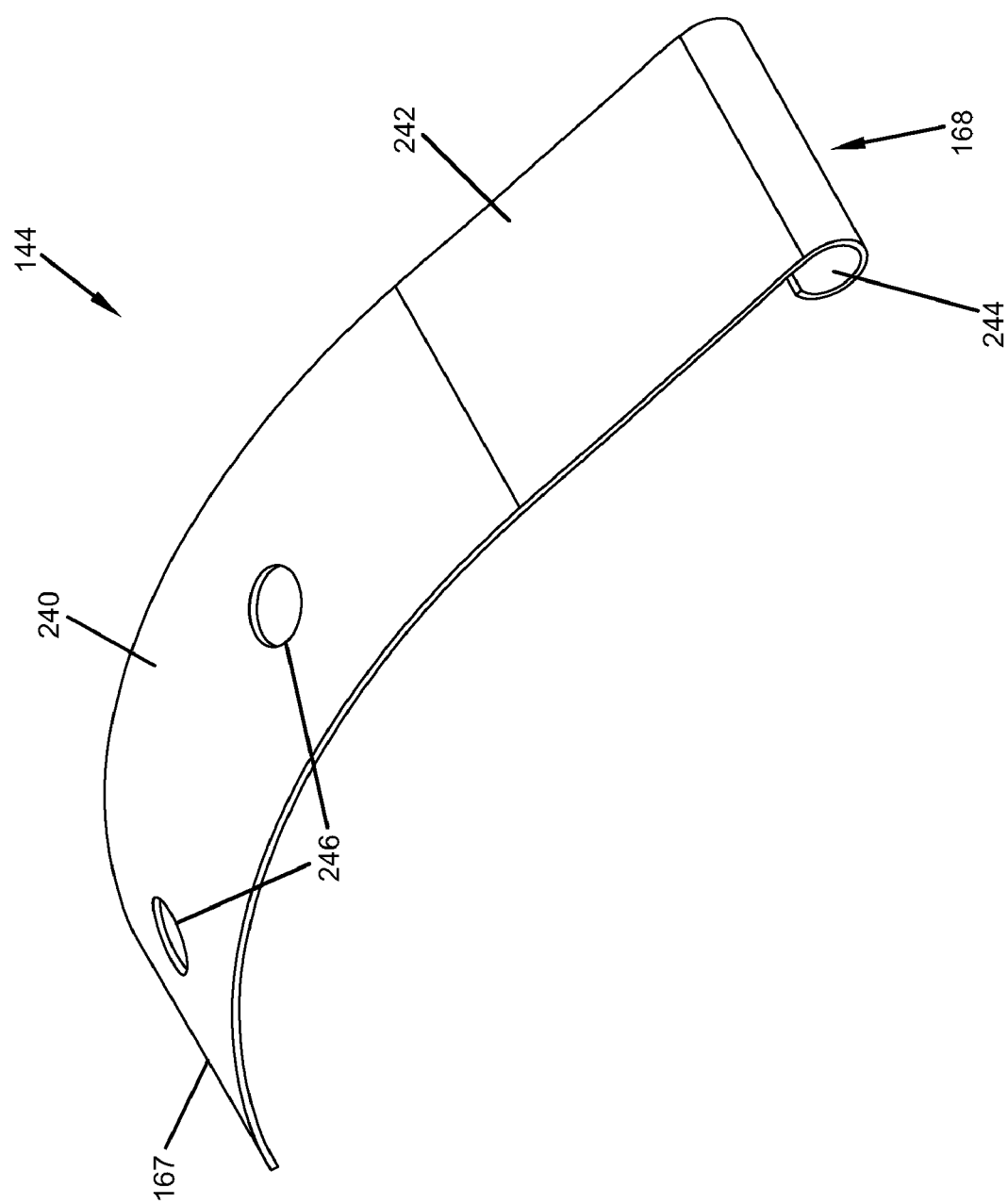
FIG. 11 is a perspective view of a flexible member of the clamp shown in FIG. 7.

FIG. 11 is a perspective view of example flexible member 144. In one embodiment, flexible member 144 includes end 167 and end 168. Flexible member 144 includes member 240, member 242, and beam support 244. Member 240 is a generally rectangular member extending between end 167 and member 242. In one embodiment, member 240 is curved to match the curve of region 132 of support beam 104. In another embodiment, member 240 is not curved until connection with region 132, which causes member 240 to bend to match the shape of region 132 to which it is being connected.

Flexible member 144 is connected to region 132 by any suitable fastener. In one embodiment, one or more holes are formed in member 240, such as by drilling, for fastening member 240 to region 132.

Flexible member 144 is formed from any suitable material, including sheet metal such as steel, aluminum, brass, copper, or a metal alloy. In another embodiment, flexible member 144 is formed from another material such as plastic, wood, ceramic, or any other desired material. In another embodiment, flexible member 144 is formed of a material capable of flexing and applying a force to beam 146 in a direction toward feet 208 and 210 when installed.

In one embodiment, member 242 is a generally rectangular region extending between member 240 and beam support 244. Connected to member 242 is beam support 244, opposite member 240. Beam support 244 is capable of supporting beam 146 of clamp 106. In the illustrated embodiment, beam support 244 is a generally cylindrical region that at least partially surrounds beam 146. Beam support 244 is formed by bending or molding the material to form a generally cylindrical shape. Beam 146 is inserted into beam support 244 to hold beam 146 in position. In another embodiment, beam support 244 is a generally flat region to which beam 146 is connected with a fastener. In this embodiment, beam 146 is connected to beam support 244 by solder, adhesive, bolt and nut, screw, or any other desired means. Beam support 244 supports beam 146 in a generally horizontal orientation, and generally parallel with directions D2 and D3 (such as illustrated in FIG. 10).

Figure 12:
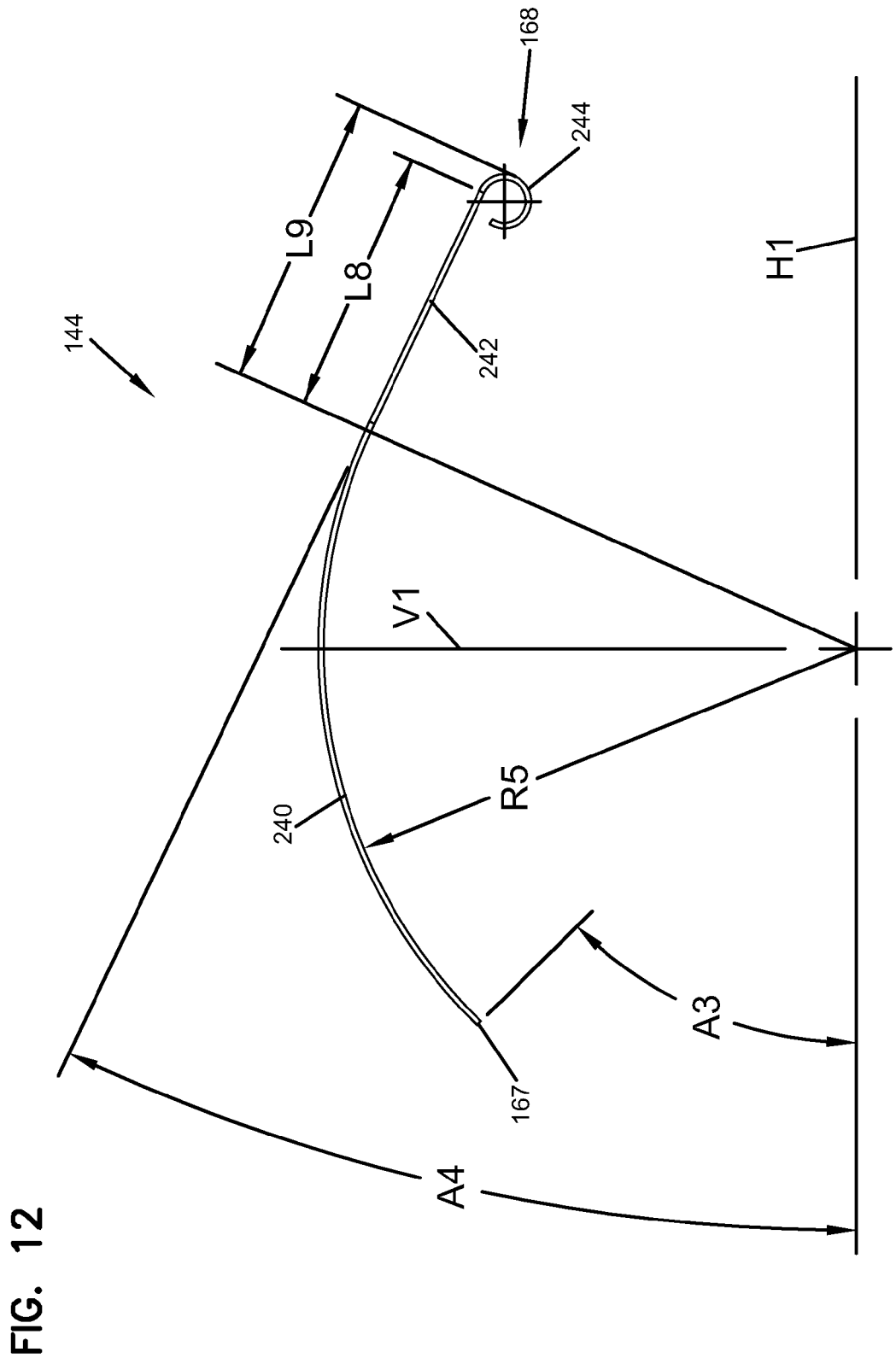
FIG. 12 is a side view of the flexible member shown in FIG. 11.

FIG. 12 is a side view of example flexible member 144. A generally horizontal plane is illustrated as Hi, and a generally vertical plane is illustrated as V1 extending through a peak of flexible member 144. These angles and dimensions are provided as one example of the illustrated embodiment. Other embodiments will have other angles and dimensions.

Possible embodiments include angle A3, the angle between the horizontal Hi and end 167 of flexible member 144. Angle A3 is in a range from about −90 degrees to about 145 degrees, and preferably from about 0 degrees to about 90 degrees. In another embodiment, angle A3 is in a range from about 30 degrees to about 60 degrees.

Possible embodiments include angle A4, an angle formed between horizontal H1 and member 242. Angle A4 is in a range from about −45 degrees to about 45 degrees, and preferably from about 0 degrees to about −45 degrees. In another embodiment, angle A4 is in a range from about 15 degrees to about 35 degrees.

Radius R5 is the radius of curvature of member 240. In one embodiment, radius R5 is substantially the same as radius R1 of support beam 104 (such as shown in FIG. 3). In possible embodiments, radius R5 is in a range from about 1 inch to about 3 inches, and preferably from about 1 inch to about 2 inches.

In the illustrated embodiment, length L8 is the length of member 242. In one example, L8 is in a range from about 0 inches to about 3 inches, and preferably from about 0.5 inches to about 1 inch. Also in the illustrated embodiment, length L9 is the length from one end of member 242 to end 168, including a portion of beam support 244. In one example, L9 is in a range from about 0.25 inches to about 3 inches, and preferably from about 0.5 inches to about 1 inch.

Figure 13:
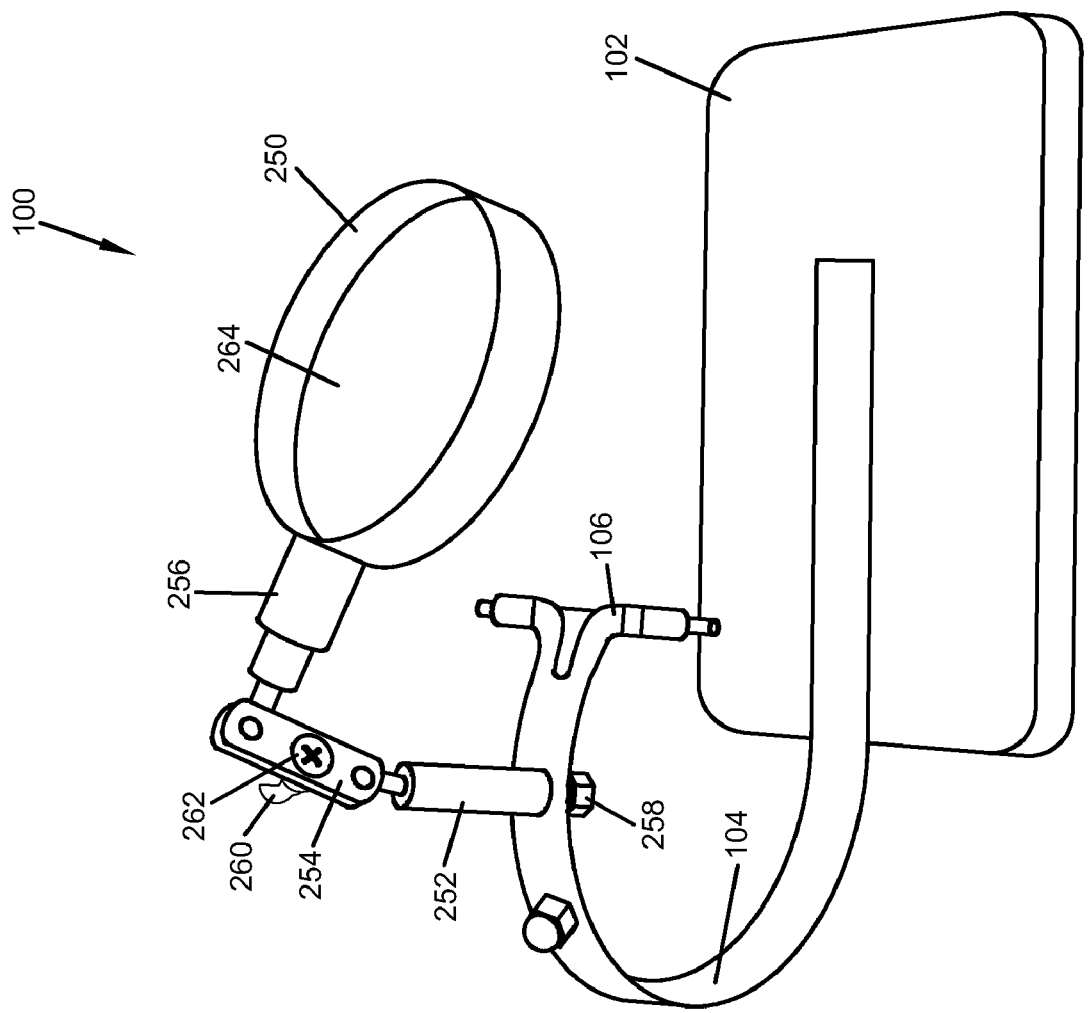
FIG. 13 is a perspective view of an alternate embodiment of the tool including a magnifier.

FIG. 13 is a perspective view of another example embodiment of tool 100. In this embodiment, magnifier 250 is included to visually enlarge portions of a bracelet and clamp 106 to aid in the connection of a bracelet. Tool 100 includes base 102, support beam 104, clamp 106 and magnifier 250. Magnifier 250 is supported by support beam 104. Spacer 252 is connected to support beam 104. In one embodiment, spacer 252 includes a threaded end capable of receiving a screw to connect spacer 252 to support beam 104. At the other end of spacer 252 is joint 254. Joint 254 is adjustable to enable proper alignment of magnifier 250 with clamp 106. Joint 254 is, for example, a ball and socket joint having one or more balls and sockets. Wing nut 260 and screw 262 clamp together the socket joint and provide adjustable friction at the joint.

Magnifier 250 extends from joint 254 and generally above clamp 106. Magnifier includes frame 256 and magnifying glass 264. Frame 256 supports the outer edges of magnifying glass 264. Magnifying glass 264 can be made of plastic, glass, or any other transparent material capable of magnifying. One benefit of magnifier 250 is that it assists a person in seeing the sometimes small clasps or other connection joints of a bracelet. Another benefit of magnifier 250 is that it assists those with visual impairments in seeing what they are doing while attempting to install a bracelet.

Joint 254 also enables magnifier 250 to be moved to a completely vertical position, or off to a side to move it out of the way if magnifier 250 is not needed to install a bracelet.

Figure 14:
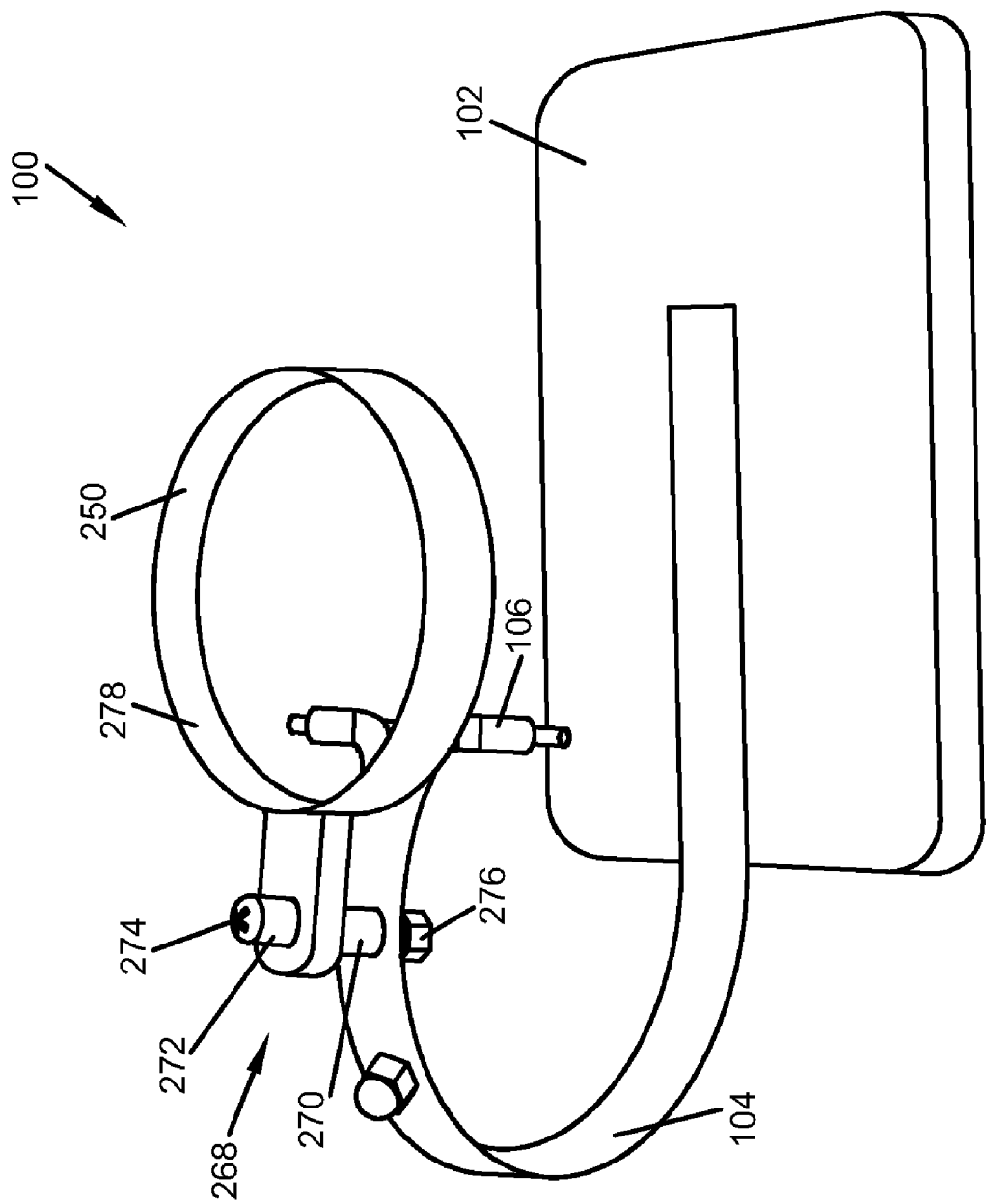
FIG. 14 is a perspective view of an alternate embodiment of the tool including a magnifier.

FIG. 14 is a perspective view of another example embodiment of tool 100. In this embodiment, magnifier 250 is again included to visually enlarge portions of a bracelet and clamp 106 to aid in the connection of a bracelet. Tool 100 includes base 102, support beam 104, clamp 106, and magnifier 250. In this embodiment, joint 268 is included to pivotally connect magnifier 250 to support beam 104. Joint 268 includes spacer 270, spacer 272, and fasteners 274 and 276 such as a screw and a nut. A portion of frame 278 is located between spacers 270 and 272 and is capable of pivoting around screw 274. In this way magnifier 250 is supported in a generally horizontal position with a proper spacing from clamp 106. In one embodiment, spacers 270 and 272 have a diameter in a range from about 0.25 inches to about 0.5 inches. In this embodiment, spacer 270 has a length in a range from about 0.05 inches to about 1 inch, and preferably from about 0.25 inches to about 0.5 inches. In this embodiment, spacer 272 has a length in a range from about 0.05 inches to about 0.5 inches, and preferably from about 0.1 inches to about 0.3 inches. Spacers 270 and 272 can be formed of any desired material including metal, plastic, wood, rubber, and the like and can be cylindrical, hexagonal, or any other desired shape.

A wide variety of other magnifier configurations are also possible, as will be readily apparent to one skilled in the art.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A tool for assisting in the installation of a bracelet, the tool comprising:
    a base;
    a support beam extending at least partially vertically upward from the base and having a first end and a second end, the first end supported by the base; and
    a clamp comprising:
        a first clamp member projecting from the second end of the support beam, wherein the first clamp member comprises a first arm and a second arm connected to the second end of the support beam, the first arm extending in a first direction and the second arm extending in a second direction, the second direction being opposite the first direction;
        a second clamp member adjacent the first clamp member, wherein the first and second clamp members are arranged to engage a portion of the bracelet therebetween, wherein the first arm of the first clamp member includes a first distal end and the second clamp member includes a second distal end, and wherein the second distal end projects beyond the first distal end to form a handle portion; and
        a flexible member arranged between the support beam and the second clamp member to flexibly support the second clamp member.

2. The tool of claim 1, wherein the support beam comprises a generally arcuate region.

3. The tool of claim 2, wherein the generally arcuate region forms an angle in a range from 200 degrees to 210 degrees.

4. The tool of claim 1, wherein the second clamp member comprises a bar adjacent to the first arm and the second arm.

5. The tool of claim 4, wherein the first and second arms are rigidly connected to the second end of the support beam.

6. The tool of claim 5, wherein the first arm and the second arm extend substantially perpendicular to the support beam.

7. The tool of claim 6, wherein the bar is substantially parallel with the first arm and the second arm.

8. The tool of claim 1, wherein the base is a substantially rectangular block.

9. The tool of claim 1, further comprising a magnifier supported by the support beam to magnify the portion of the bracelet.

10. The tool of claim 9, further comprising a spacer connected between the magnifier and the support beam, and wherein the magnifier is pivotally connected to the spacer.

11. A bracelet installation tool comprising:
    a clamp arranged to engage a portion of a bracelet during installation, the clamp comprising:
        a first clamp member having a distal end, wherein the first clamp member comprises a first arm and a second arm connected to the second end of the support beam, the first arm extending in a first direction and the second arm extending in a second direction, the second direction being opposite the first direction, wherein the first arm of the first clamp member includes a first distal end;
        a second clamp member adjacent the first clamp member, wherein the second clamp member includes a second distal end, and wherein the second distal end projects beyond the first distal end to form a handle portion, wherein the first and second clamp members are arranged to engage a portion of the bracelet therebetween; and
        means for flexibly supporting the second clamp member adjacent the first clamp member;
    means for engaging with a surface; and
    means for supporting the clamp in a spaced relationship to the surface.

12. The bracelet installation tool of claim 11, wherein the means for engaging with a surface is a base capable of frictionally engaging the surface.

13. The bracelet installation tool of claim 11, wherein the means for supporting the clamp in a spaced relationship to the surface is a support beam.

14. The bracelet installation tool of claim 11, wherein the means for flexibly supporting the second clamp member adjacent the first clamp member is a flexible member arranged to apply a force to the second clamp member to press the second clamp member generally in a direction toward the first clamp member.

15. The bracelet installation tool of claim 11, further comprising means for visually enlarging the portion of the bracelet.

16. A method of installing a bracelet around a wrist of a person, the person having a first hand and a second hand, the first hand being associated with the wrist, the method comprising:
    engaging a first portion of the bracelet between a first member and a second member of a clamp, the clamp being supported in a spaced relationship from a base by a support beam, wherein engaging a first portion of the bracelet comprises:
        applying a force to a distal end of the second member in a direction away from the first member to cause the second member to become spaced from the first member;
        inserting the first portion of the bracelet between the first member and the second member; and
        removing the force from the second member;
    placing the wrist adjacent the clamp;
    manipulating a second portion of the bracelet, generally opposite the first portion, to connect the first portion of the bracelet to the second portion, such that the bracelet surrounds the wrist; and
    disengaging the bracelet from the clamp.

17. The method of claim 16, wherein applying the force to the distal end of the second member causes a flexible member supporting the second member to flex.

18. The method of claim 16, wherein disengaging the bracelet from the clamp comprises pulling the bracelet from the clamp.

19. The method of claim 16, further comprising looking through a magnifier supported adjacent to the clamp while manipulating the second portion of the bracelet.

20. The tool of claim 1, wherein the second arm of the first clamp member includes a third distal end and the second clamp member includes a fourth distal end, and wherein the fourth distal end projects beyond the third distal end to form a second handle portion.

* * * * *

UNITED STATES PATENT AND TRADEMARK OFFICE
CERTIFICATE OF CORRECTION

PATENT NO. : 7,721,924 B2
APPLICATION NO. : 11/787322
DATED : May 25, 2010
INVENTOR(S) : McCluhan It is certified that error appears in the above-identified patent and that said Letters Patent is hereby corrected as shown below:

Col. 3, line 50: "gap GI for the" should read --gap G1 for the--

Col. 10, line 2: "as Hi, and a" should read --as H1, and a--

Col. 10, line 8: "horizontal Hi and end" should read --horizontal H1 and end--

Signed and Sealed this

Twenty-sixth Day of October, 2010

David J. Kappos
*Director of the United States Patent and Trademark Office*